Aug. 8, 1961     H. NICOLAS     2,995,616
METAL SHEATHED ELECTRIC CABLE
Filed April 23, 1958
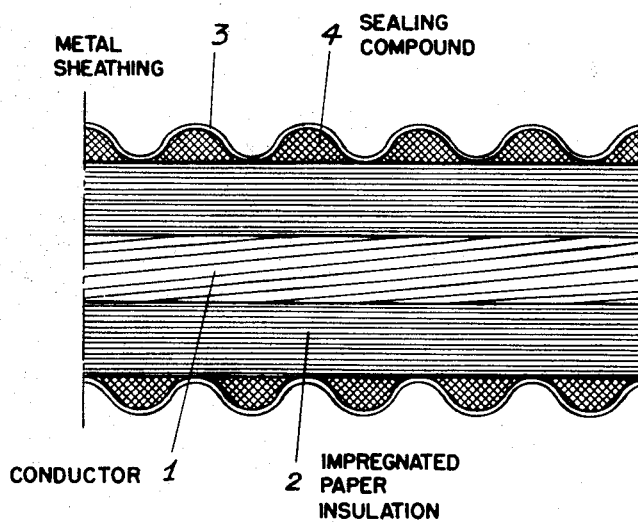
INVENTOR
HENRY NICOLAS
BY Paul M. Craig, Jr.
ATTORNEY

2,995,616
METAL SHEATHED ELECTRIC CABLE
Henry Nicolas, Lyon, France, assignor to Compagnie Generale d'Electricite, Paris, France, a corporation of France
Filed Apr. 23, 1958, Ser. No. 730,464
Claims priority, application France May 3, 1957
9 Claims. (Cl. 174—102)

In the manufacture of electric cables, external watertightness may be ensured by means of metal sheathings made, notably, of aluminum, which, with a view to giving them greater flexibility, are grooved along their length either transversely or helically.

It has been found that these groovings have a certain drawback in the case of high-tension power cables which are insulated with impregnated paper, of the type known as "viscous" or "solid matter"; under the effect of variations in the cable's load the impregnated matter becomes detached from the insulating wrapping and lodges itself in the groovings of the sheath, thereby giving rise to the paper's becoming dried out in places and prejudicing the life of the cable.

The object of the invention is to eliminate this drawback. It has as its subject a high-tension electric cable insulated with impregnated paper and protected by a watertight, grooved, metal sheathing, characterized in that all the empty spaces between the insulation and the sheathing are filled up by a high viscosity compound whatever the temperature reached by the cable, and without any chemical or physical action on the insulation.

This sealing compound, which may be insulated or semi-conducting will, so as not to harm the insulation, be of a mineral oil base similar to that of the insulation. The mineral oil compound may be jelled by a colloidal charge with a further pulverulent charge to vary its insulating or semi-conducting properties as indicated in the following examples.

The sealing compound which is insulating will, for example, be made up as follows with the percentages being given as percentages by weight:

| | Percent |
|---|---|
| Mineral oil identical with that of the cable | 45 to 55 |
| Bentonite or colloidal silica | 1 to 8 |
| Micro-talc or powdered mica | 37 to 54 | and the semi-conductor sealing compound will have the following composition in which the percentages are by weight:

| | Percent |
|---|---|
| Mineral oil identical with that of the cable | 65 to 75 |
| Bentonite or colloidal silica | 1 to 4 |
| Acetylene black or carbon black, semi-conducting | 21 to 34 |

In certain cases, the mineral oil may be replaced by a pure polybutene of molecular weight 1000 to 1500.

The rheological properties of this sort of compound are such that it does not flow whatever the temperature which may be reached in the cable.

To manufacture such a cable, the insulated conductor or conductors are covered with a layer of sealing compound which has been previously raised to an appropriate temperature. Afterwards, when the sheathing is fitted, it literally impresses itself in the still plastic compound and forces same to penetrate into and fill up all the inner grooves of the sheathing.

The invention will be further described with reference to the accompanying sole drawing which depicts one, non-limitative, example of execution of a length of cable as per the invention, having one single insulated conductor.

In this figure, 1 is the conductor which is constituted, for example, by a strand of copper wire with an insulation 2 made of impregnated paper. The watertight, grooved, metal sheathing is designated 3 and the groovings are completely filled inside, with a sealing compound 4, the composition of which complies with the data given above, in accordance with the invention.

I claim:
1. High-tension electric cable with an insulation of paper impregnated by a dielectric substance and protected by a grooved metal sheathing, the grooves of said sheathing providing spaces between the sheathing and the peripheral surface of said insulation, all said spaces between the insulation and the sheathing being filled up by an impervious compound of high viscosity regardless of the temperature which may be reached by the cable during normal use, said compound having no physical or chemical action on the insulation and comprising a jellified dielectric substance including substantially the same dielectric substance as the insulation, a colloidal charge, and a thickening and pulverulent charge.

2. Electric cable as claimed in claim 1 characterized in that the dielectric impregnation substance in the paper includes a mineral oil.

3. Electric cable as claimed in claim 2, characterized in that the mineral oil is replaced, in part at least, by polybutene of molecular weight 1000 to 1500.

4. Electric cable as claimed in claim 2, wherein said compound comprises 45 to 55% mineral oil identical to that in the dielectric impregnation substance in the paper, 1 to 8% of a material selected from the group consisting of bentonite and colloidal silica, and 37 to 54% of a material selected from the group consisting of micro-talc and powdered mica, all percentages being percentages by weight.

5. Electric cable as claimed in claim 2, wherein said compound comprises 65 to 75% of a mineral oil identical to that in the dielectric impregnation substance in the paper, 1 to 4% of a material selected from the group consisting of bentonite and colloidal silica, and 21 to 34% of a semi-conductor material selected from the group consisting of acetylene black and carbon black, all percentages being percentages by weight.

6. Electric cable as claimed in claim 1, wherein the colloidal charge consists of a material selected from the group consisting of bentonite and colloidal silica.

7. Electric cable as claimed in claim 1, wherein the thickening and pulverulent charge consists of a non-conductor material selected from the group consisting of micro-talc and powdered mica.

8. Electric cable as claimed in claim 1, wherein the thickening and pulverulent charge consists of a semi-conductor material selected from the group consisting of acetylene black and carbon black.

9. Electric cable as claimed in claim 1, wherein said sheathing comprises a material selected from the group consisting of aluminum and aluminum alloy.

References Cited in the file of this patent

UNITED STATES PATENTS

| 2,808,450 | Peters | Oct. 1, 1957 |
| 2,852,597 | Raydt et al. | Sept. 16, 1958 |

FOREIGN PATENTS

| 356,706 | Great Britain | Sept. 2, 1931 |
| 40,453 | Netherlands | Apr. 15, 1937 |
| 478,353 | Great Britain | Jan. 17, 1938 |
| 761,642 | Great Britain | Nov. 14, 1956 |